(12) United States Patent
Jung et al.

(10) Patent No.: US 8,583,139 B2
(45) Date of Patent: Nov. 12, 2013

(54) CONTEXT DIARY APPLICATION FOR A MOBILE TERMINAL

(75) Inventors: Younghee Jung, Helsinki (FI); Per Persson, Helsinki (FI); Petri Piippo, Karkkila (FI); Petri H. Mäenpää, Helsinki (FI)

(73) Assignee: Nokia Corporation, Espoo (FI)

( * ) Notice: Subject to any disclaimer, the term of this patent is extended or adjusted under 35 U.S.C. 154(b) by 1683 days.

(21) Appl. No.: 11/026,663

(22) Filed: Dec. 31, 2004

(65) Prior Publication Data
US 2006/0148528 A1 Jul. 6, 2006

(51) Int. Cl.
H04W 24/00 (2009.01)
G06F 3/00 (2006.01)
H04W 64/00 (2009.01)
H04W 4/02 (2009.01)

(52) U.S. Cl.
CPC ............ *H04W 64/00* (2013.01); *H04W 4/02* (2013.01)
USPC ............ 455/456.1; 455/457; 455/414.2; 600/300; 600/301; 715/708

(58) Field of Classification Search
USPC ......... 455/414.2, 456.1, 566, 457; 340/573.3, 340/573.4, 601; 600/300, 301
See application file for complete search history.

(56) References Cited

U.S. PATENT DOCUMENTS

| | | | |
|---|---|---|---|
| 4,952,928 A * | 8/1990 | Carroll et al. | 340/10.41 |
| 5,181,519 A * | 1/1993 | Bible | 600/517 |
| 5,447,164 A * | 9/1995 | Shaya et al. | 600/523 |
| 5,652,570 A * | 7/1997 | Lepkofker | 340/573.4 |
| 5,778,882 A * | 7/1998 | Raymond et al. | 600/513 |
| 6,038,522 A * | 3/2000 | Manson et al. | 702/150 |
| 6,064,975 A | 5/2000 | Moon et al. | |
| 6,100,806 A * | 8/2000 | Gaukel | 340/573.4 |
| 6,512,456 B1 * | 1/2003 | Taylor, Jr. | 340/573.1 |
| 6,525,768 B2 * | 2/2003 | Obradovich | 348/231.99 |
| 6,809,724 B1 * | 10/2004 | Shiraishi et al. | 345/169 |
| 6,842,877 B2 * | 1/2005 | Robarts et al. | 715/708 |
| 6,906,643 B2 * | 6/2005 | Samadani et al. | 340/995.18 |
| 6,978,169 B1 * | 12/2005 | Guerra | 600/523 |
| 7,069,003 B2 * | 6/2006 | Lehikoinen et al. | 455/414.2 |

(Continued)

FOREIGN PATENT DOCUMENTS

WO WO2004/057892 A 7/2004

OTHER PUBLICATIONS

Office Action of the corresponding European Patent Application, No. 05826040.7-1244 dated Jan. 13, 2010.

(Continued)

*Primary Examiner* — Duc M Nguyen
(74) *Attorney, Agent, or Firm* — Ditthavong Mori & Steiner, P.C.

(57) ABSTRACT

The invention provides a presentation of contextual information to a digital device in relation to a period of time. As such the invention provides for efficient user access to historical, as well as, current and future or forecasted contextual information. In addition, the present invention provides for current contextual information to be presented in an idle mode view, a scrolling bar mode view or another inconspicuous view. Additionally the present invention provides a novel means of using context information to create multimedia file presentations; image or video file presentations that can be associated with previous periods of time, locations or other context data.

14 Claims, 11 Drawing Sheets

(56) References Cited

U.S. PATENT DOCUMENTS

| | | |
|---|---|---|
| 7,069,259 B2 * | 6/2006 | Horvitz et al. .................. 706/25 |
| 7,073,129 B1 * | 7/2006 | Robarts et al. ................ 715/740 |
| 7,395,507 B2 * | 7/2008 | Robarts et al. ................ 715/744 |
| 7,543,233 B2 * | 6/2009 | Reponen et al. ............... 715/708 |
| 2002/0083025 A1 * | 6/2002 | Robarts et al. ................... 706/12 |
| 2002/0164995 A1 * | 11/2002 | Brown et al. ................. 455/456 |
| 2002/0196280 A1 | 12/2002 | Bassett et al. |
| 2004/0027245 A1 * | 2/2004 | Schlager et al. ........... 340/573.1 |
| 2004/0078372 A1 | 4/2004 | Huuskonen |
| 2004/0267099 A1 * | 12/2004 | McMahon et al. ............ 600/300 |
| 2005/0073443 A1 * | 4/2005 | Sheha et al. ................ 340/995.1 |
| 2005/0108644 A1 * | 5/2005 | Finke-Anlauff et al. ...... 715/721 |
| 2005/0138066 A1 * | 6/2005 | Finke-Anlauff et al. .. 707/104.1 |

OTHER PUBLICATIONS

Supplementary European Search Report, EP 05 82 6040, issued May 7, 2009.

* cited by examiner

CONTEXT DIARY APPLICATION FOR A MOBILE TERMINAL

FIELD OF THE INVENTION

The present invention relates to digital devices and, more specifically, to an application for providing digital communication devices, such as mobile terminals and the like, with a context diary that provides a user access to context information in relation to a period or moment in time.

BACKGROUND OF THE INVENTION

Mobile digital terminals, such as mobile telephones and the like are becoming increasing commonplace throughout the world. Recent technological advances in processing and storage capacity have made it possible for such terminals to become multi-functional. For example, no longer is the mobile telephone limited to telephonic voice communication but may also provide other means of digital communication, such as digital networking (i.e., Internet communication, text messaging, and the like), image or video capture means, digital video broadcast reception and the like.

As the communication means and the functionality of such terminals expands, such terminals will readily come in contact with an increasingly voluminous amount of media items, such as email, voice mail, digital image files, digital video files and the like. As the memory capacity of theses terminals increases, either via internal memory capacity or the ability to readily access external memory storage elements, the user of the device will have the capability to store and/or access all of these media items.

The increasing amount of media items stored or available to the digital device has been the impetus behind implementation of file storage and organization applications and more specifically, calendar-type applications that allow the user to categorize media items according to the date and/or time associated with the media item. For example, the Microsoft Outlook application, available form the Microsoft Corporation of Redmond, Wash., provides for storage and categorization of email, voicemail and the like according to the date of receipt or the date of transmission. Other applications have been developed that are more suitable to mobile terminals and provide for the user to efficiently locate a media item according to the time associated with the media item. For example, if the media item is an image file captured by a mobile terminal (i.e., a photograph taken by a camera equipped mobile telephone) the calendar application will typically associate the image file with the date and time at which the image file was created or an event associated with the image file (e.g., a birthday party, a meeting, a family event, etc). Thus, the calendar-applications allow the user to store media files, such as email, short message service (SMS) messages, voicemail, image files, video files and the like in diary format to allow the user ready and efficient access to the media items. However, currently, extensive use of such mobile terminal calendar-type applications has not been realized by the device consumer.

Recent innovations have made it possible for the mobile terminal to provide context-awareness functionality, such as location of the device, environment of the device's location, movement of the device and the like. Such functionality is provided by including corresponding sensors in the device or providing for the terminal to communicate with external resources that provide context information. For example, the mobile terminal may be equipped with a Global Positioning Sensor (GPS) that provides the present location of the mobile device, a temperature sensor, an altitude sensor, motion or acceleration sensors and the like. External resources may be any external device capable of providing contextual information, such as access points, network nodes, other mobile communication devices and the like.

Context-awareness is a key area of potential for mobile devices because it enables differentiation from stationary devices, like desktop computers, because mobile use is characterized by constant change in context (i.e., the device moves constantly and encounters constantly changing environments). Moreover context-awareness enables an overall richer user-experience. It provides the user with valuable information related to the context of the device.

In a typical context-awareness application the mobile terminal will be capable of providing current contextual information. For example, an application may implemented whereby the device is capable of providing the user through a user interface, such as a display, the current location of the device, the temperature, altitude, barometric pressure or the like of the device's current location.

Contextual information is also captured, continuously or at a given time interval and provided to certain types of applications that utilize contextual information accumulated over time. For instance, in order to provide contextually sensitive set of bookmarks according to the location, the application may need to record the browsing behaviors in relation to the device location over time. However, the applications that customize the behavior, i.e., context and the content set according to recognized usage patterns do need to display the raw context data to the user. As such, the users are not aware that the context information is being captured and no further utilization of the context data by the user is provided for.

Therefore a need exists to provide a user access to captured context data and, more specifically, access to the captured context data in relation to a period or moment in time. Such an application will provide the user of the mobile terminal ready and efficient access to captured context data. This type of data will provide the user with a diary as to where the device (and thus the user) was located at a previous point in time and other previous data related to the context of the terminal. An additional need exists to provide the user with various access modes to the context data such that the data can benefit from the data and use the data in other applications.

BRIEF SUMMARY OF THE INVENTION

The present invention provides for methods, computer program products and devices for providing the user of digital device a diary of context information. The diary provides context information, such as device location, device movement, device environment and the like in relation to a period of time. In this regard, the diary utilizes a time-line based user-interface to display captured context information. It should be noted that for the purposes of the invention the term "a period of time" includes a moment in time, an event in time and any other time entity. As such, the diary provides a device user efficient access to contextual information that is captured and stored by the digital device. Thus, the invention provides a means of displaying raw context information without the need to perform complicated analysis on the information prior to display. By limiting complicated analysis, the invention does not require additional processing/computational power nor does it require additional memory. In addition the diary provides the user graphical presentations that allow for the user to navigate between a general overview of contextual information to more detailed views of selected context data.

In one embodiment of the invention a computer program product for providing access to context information on a digital device is provided. The product includes a computer readable storage medium having computer-readable program instructions embodied in the medium. The computer-readable program instructions include first instructions for generating a context view that provides for at least one category of the context information and provides user-access to at least one item of context information within the at least one category; and second instructions for generating a timeline view that is presented in combination with the context view and provides user-access to the at least one item of context information in relation to a period of time. In this regard the product is a context diary that provides the user with access to context information in relation to a period of time, moment in time, event, location or some other contextual parameter.

The product may also include third instructions for generating a media view that provides access to at least one digital media file and is presented in combination with the timeline view to provide user-access to the at least one digital media file in relation to a period of time. While the context diary may be a stand-alone application in many instances it will be combined with a calendar application or a media diary application to provide one concise application that provides access to future information, current information and past information. In the combined context, media view product the context information will typically be associated with one or more digital media files. The association will typically be related to a time period and will indicate within the respective context and media views by some form of indicator. The first, second and third instructions will typically be implemented concurrently to generate a context access view that provides user-access to the context view in combination with the timeline view and the media view in combination with the timeline view.

The invention is also embodied in a method for accessing context information on a mobile terminal. The method includes the steps of monitoring the mobile terminal environment to determine one or more context data and presenting, on a mobile terminal display, a context view that provides at least one context category associated with the one or more context data and at least one context item within the at least one context category. The at least one context item is related within the context view to a period of time, typically a past period of time. The step of monitoring of the mobile terminal environment to determine one or more context data further may include receiving one or more context data from within the mobile terminal, i.e., an internal sensor or an internal application, or receiving one or more context data from an external context data source that is in wireless communication with the mobile terminal; i.e., an Internet resource, a device, a sensor or broadcast data, etc. The step of presenting a context view may further include presenting, on the mobile terminal display, the context view in combination with a timeline view that provides at least one context category associated with the one or more context data and at least one context item within the at least one context category associated with a period of time within the timeline view. The context category may include calendar events, terminal location, short-range communication devices encountered, location characteristics, terminal movement, individuals encountered, personal user health characteristics, environment characteristics and the like.

The method may further include the steps of presenting, on the mobile terminal display, a calendar view; and electing a period of time within the calendar view for presenting the context view that is associated with the period of time.

The invention is also defined by a mobile terminal device for providing user-access to context data. The device includes a display, a processing unit in communication with the display and a memory module in communication with the processor. The memory module stores a context diary application executed by the processor. The context diary application generates a context view and a timeline view that are displayed on the display concurrently such that the user may be provided access to context data within the context view in relation to a period of time within the timeline view.

The device will typically include one or more sensors in communication with the processor for sensing one or more personal context data. The one or more context data is provided to the context diary application such that the context view provides user-access to the context data sensed by the one or more sensors. The memory module may further store one or more context data-generating applications that generate one or more context data. The one or more context data is provided to the context diary application such that the context view provides user-access to the context data generated by the one or more context data-generating applications.

The device may also additionally include a wireless communication module in communication with the processor that provides for wireless communication with external context sources that provide one or more context data to the application such that the context view provides user-access to the context data communicated from the external elements.

In yet another embodiment of the present invention a user interface application for a digital terminal is defined. The application includes first instructions for generating the display of a context view in combination with a timeline view that provides a display of one or more context data in relation to periods of time and second instructions for selecting, by user input, one of the one or more context data to provide a more detailed context view related to the data associated with the activated context data. In this regard, the user interface application provides the user with a context view that provides a general overview of context data and a user may select an entry from within the view to provide for the presentation of more detailed information related to the entry.

Additionally the user interface may provide for a generation and display of a media view in combination with the timeline view that provides a display of one or more media files in relation to periods of time. The first instructions may additionally provide for visual indication on the display of an association between one or more context data and the one or more media files. In this regard, the second instructions may further include instructions for selecting, by user input, the one or more context data or the one or more media files to visually indicate an association between one or more context data and one or more media files.

The invention is also embodied in a method for providing user-access to current context information on a mobile terminal. The method includes the steps of monitoring the current mobile terminal environment to determine one or more context data, presenting the currently monitored context data in user-accessible form on a display of the mobile terminal, updating the context data on the display when there is a change in the mobile terminal environment; and accessing the monitored context data to provide user management of the context data.

The step of monitoring the mobile terminal environment to determine one or more context data may further include receiving context data from within the mobile terminal or receive the context data from an external context source that is in wireless communication with the mobile terminal.

The step the presenting the currently monitored context data in user-accessible form on a display of the mobile terminal monitored context data in user-accessible form on a display of the mobile terminal may further include presenting the monitored context data on an idle screen mode, a ticker bar mode that scrolls monitored context data, on a background/wallpaper image, within a secondary application or the like.

The step of updating the context data on the display when there is a change in the mobile terminal environment may further defines the change in the mobile terminal environment as a change in terminal location; detection of an external context data source; acknowledging the disappearance of a signal from a detected external context data source and detecting a new value for at least one of the monitored context data.

Thus, the present invention provides contextual information to digital device user in a presentation that associates the contextual information with a period of time. As such the present invention provides for efficient user access to historical, as well as, current contextual information. In addition, the present invention provides for current contextual information to be presented in an idle mode view, a scrolling bar mode view or another inconspicuous view. Additionally the present invention provides a novel means of using context information to create multimedia file presentations; image or video file presentations that can be associated with previous periods of time, locations or other context data.

BRIEF DESCRIPTION OF THE DRAWINGS

Figure 1:
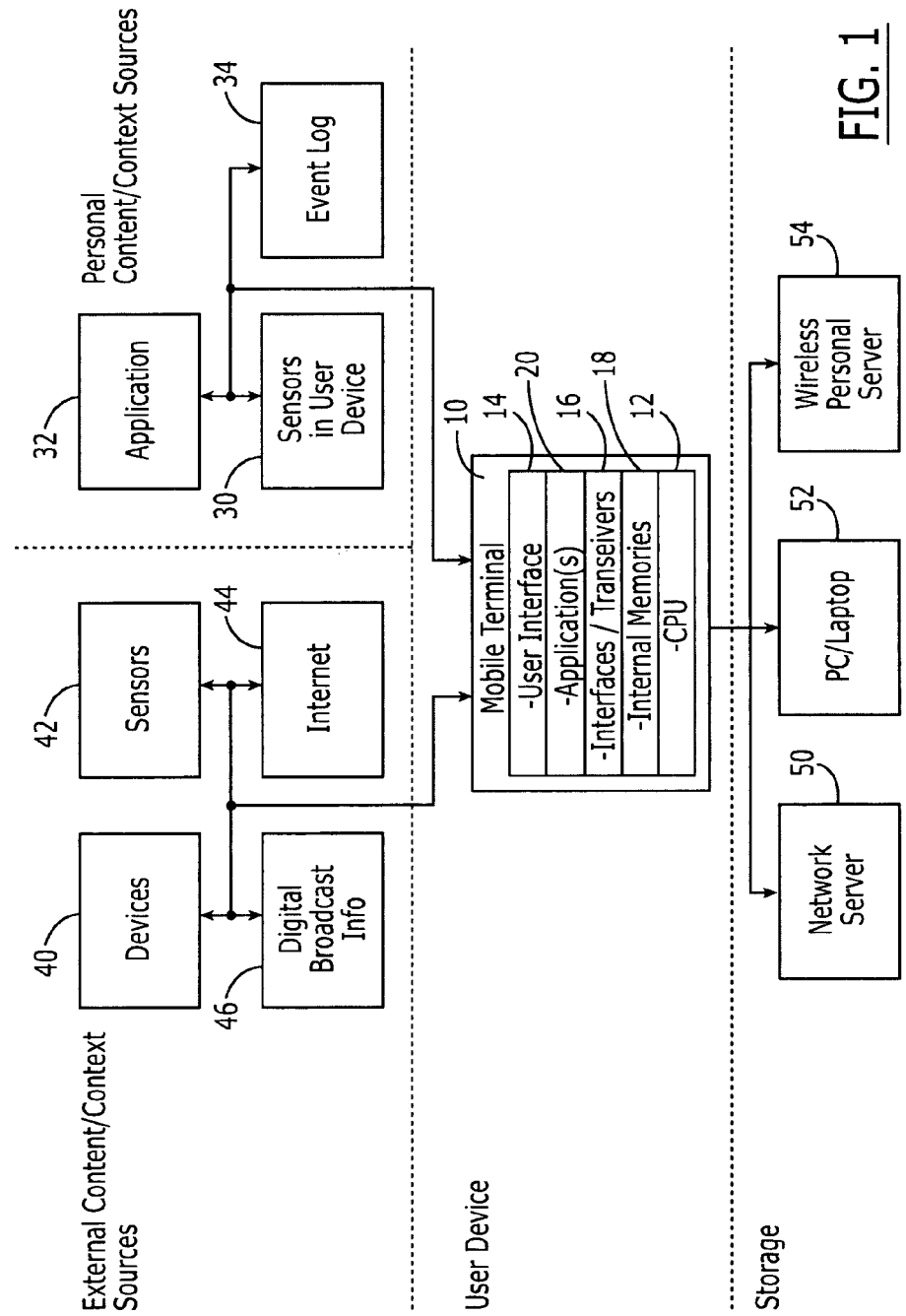

Having thus described the invention in general terms, reference will now be made to the accompanying drawings, which are not necessarily drawn to scale, and wherein:

FIG. 1 is a cell diagram of the overall system for context information distribution and storage, in accordance with an embodiment of the present invention.

Figure 2:
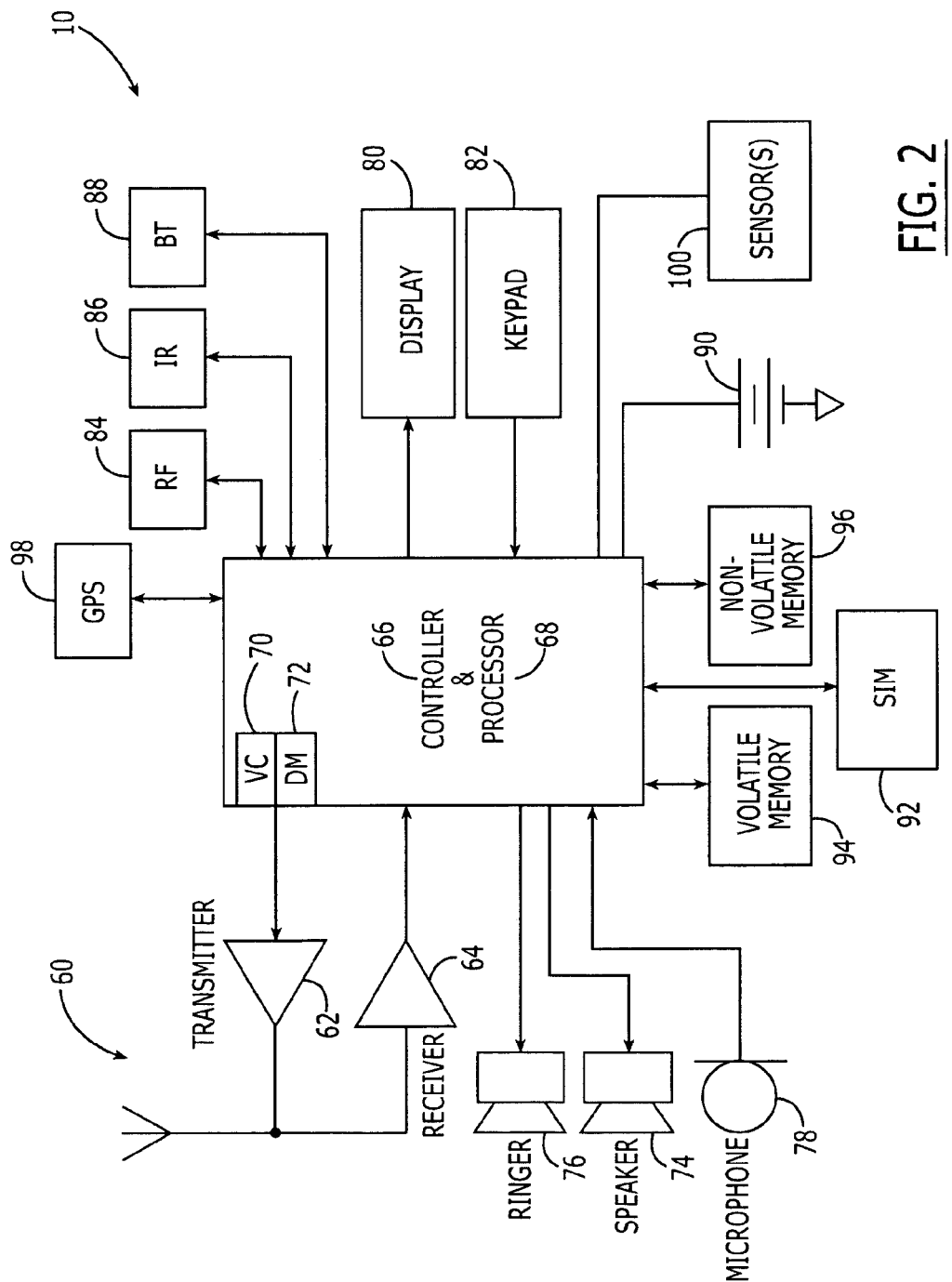

FIG. 2 is a cell diagram of a mobile terminal implementing a context diary application in accordance with an embodiment of the present invention.

Figure 3:
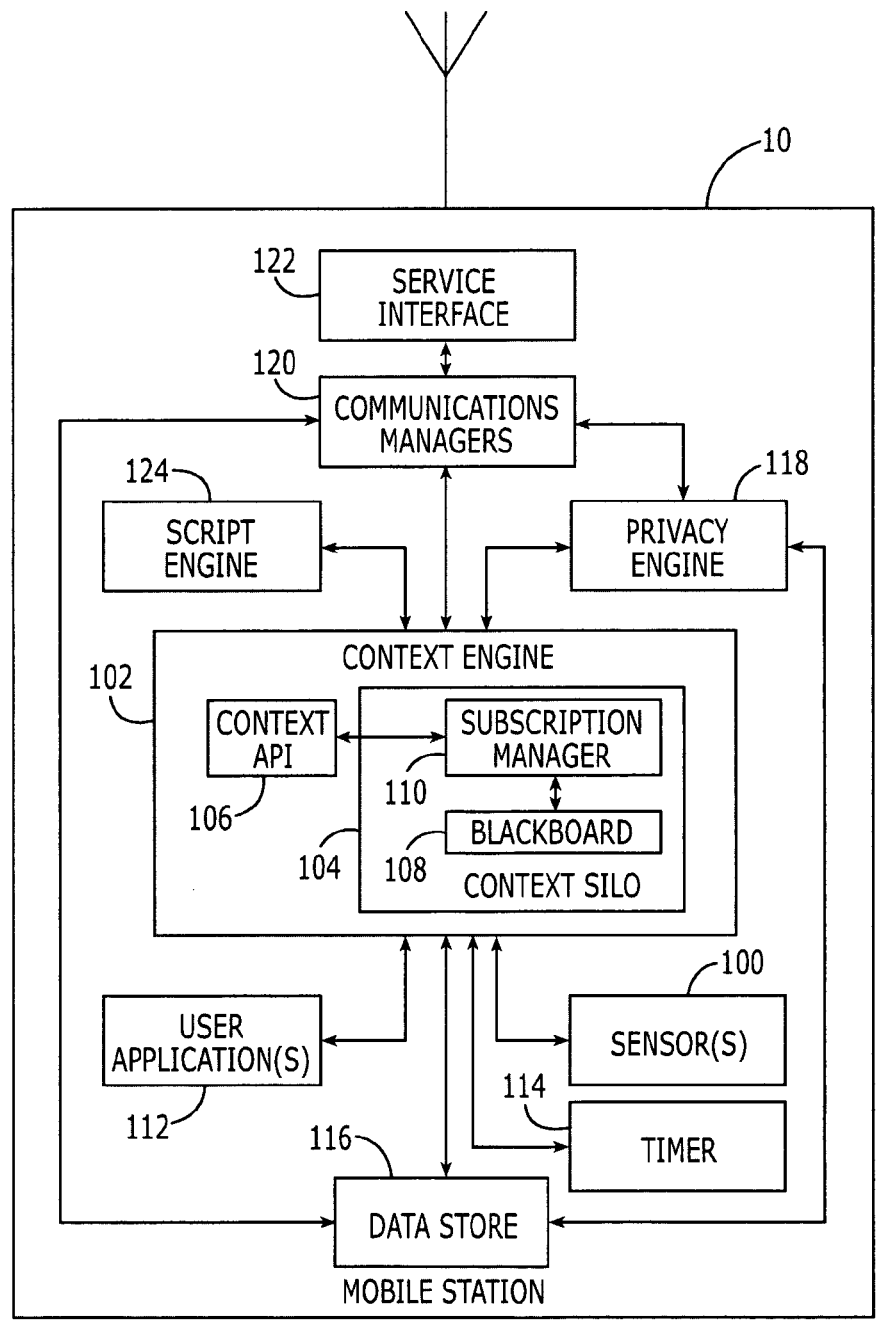

FIG. 3 is a cell diagram of a mobile terminal implementing a context engine for capture and processing of context data, in accordance with an embodiment of the present invention.

Figure 4:
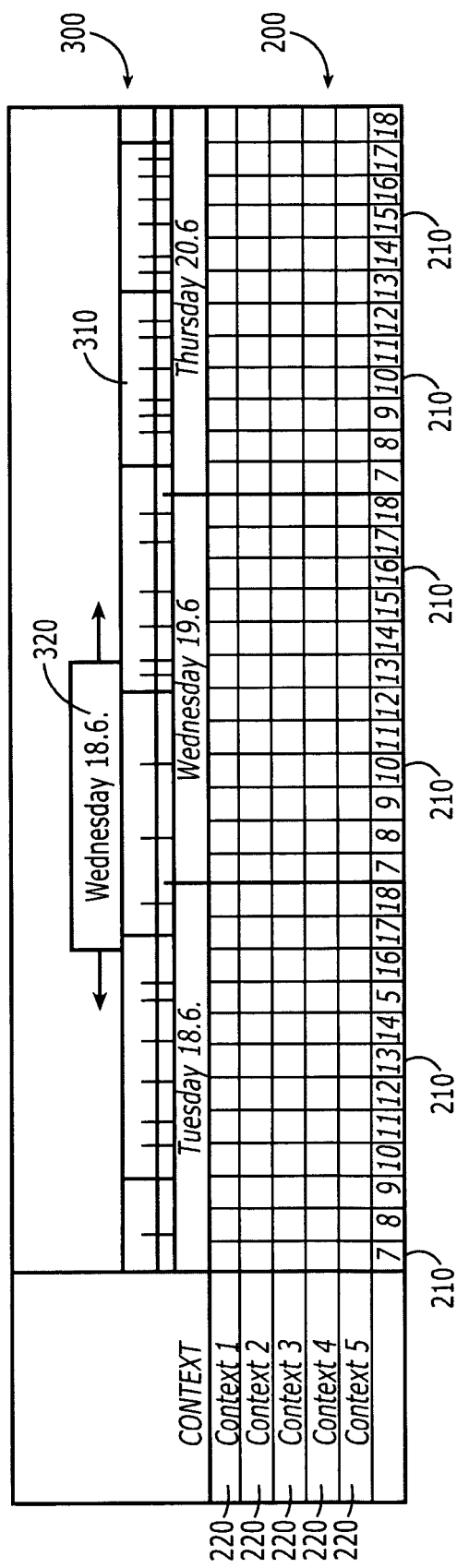

FIG. 4 is a screenshot or view of the context diary application that combines the context view with the timeline view, in accordance with an embodiment of the present invention.

Figure 5:
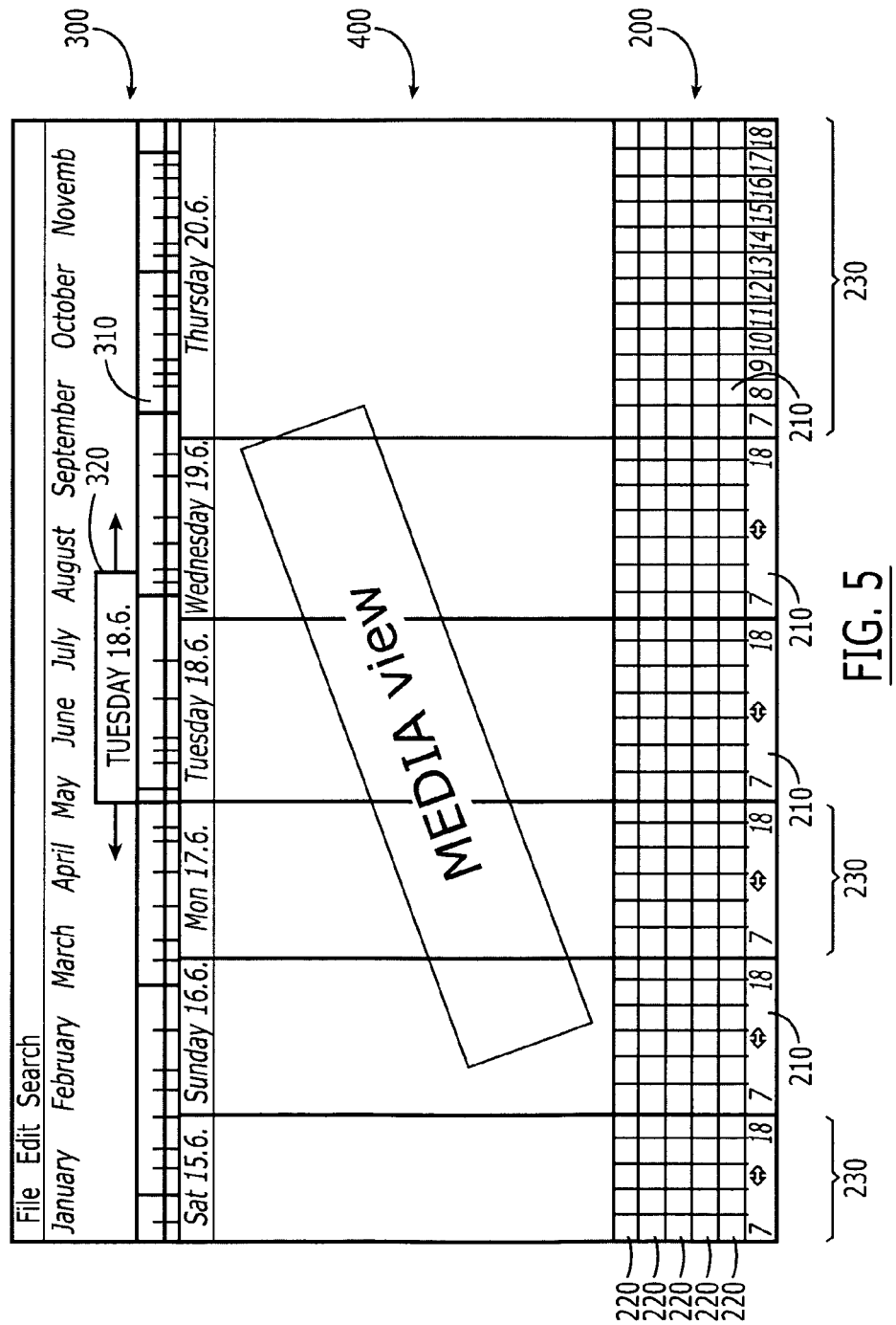

FIG. 5 is a screenshot or view of the diary application that combines the context view, the media view and the timeline view, in accordance with an embodiment of the present invention.

Figure 6:
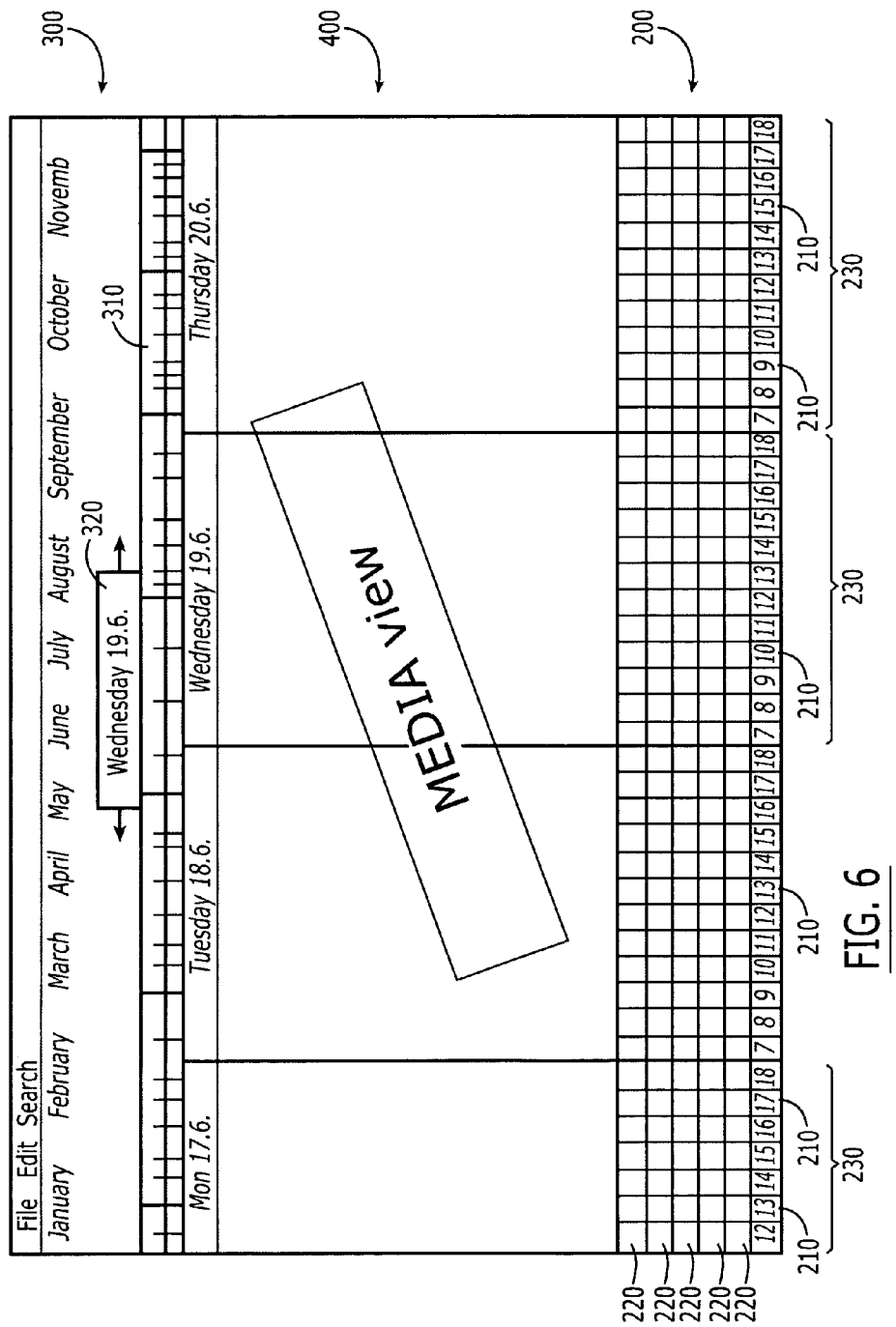

FIG. 6 is an alternate screenshot or view of the diary application that combines the context view, the media view and the timeline view, in accordance with an embodiment of the present invention.

Figure 7:
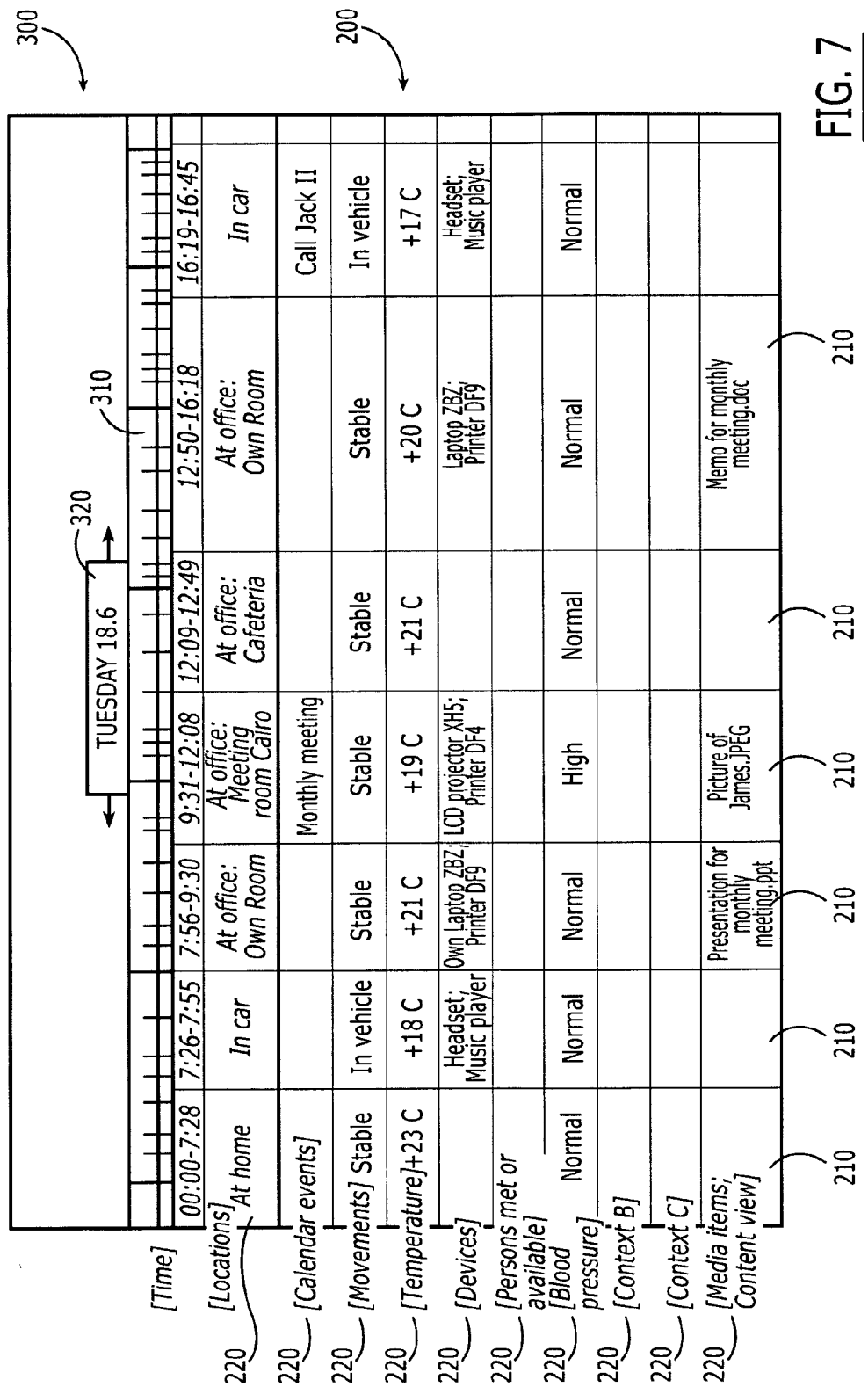

FIG. 7 is a screenshot or view of the context diary application in which the cells of the context view matrix provide for context information, in accordance with an embodiment of the present invention.

Figure 8:
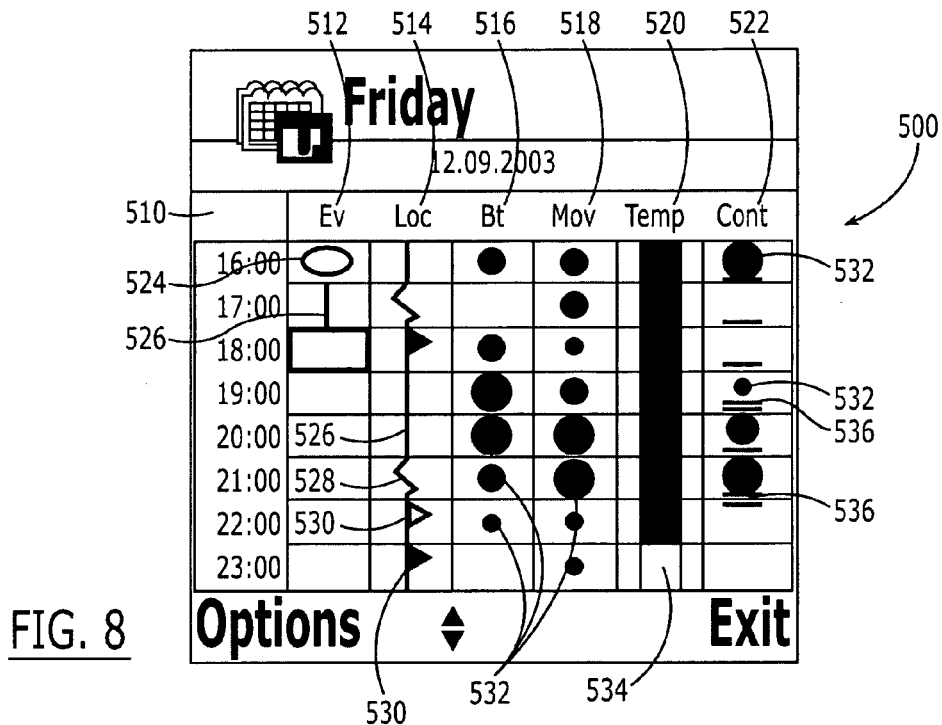

FIG. 8 is a screenshot or view of the context diary application in which the cells of the context view matrix provide for visual attributes/icons that are associated with context information, in accordance with an embodiment of the present invention.

Figure 9:
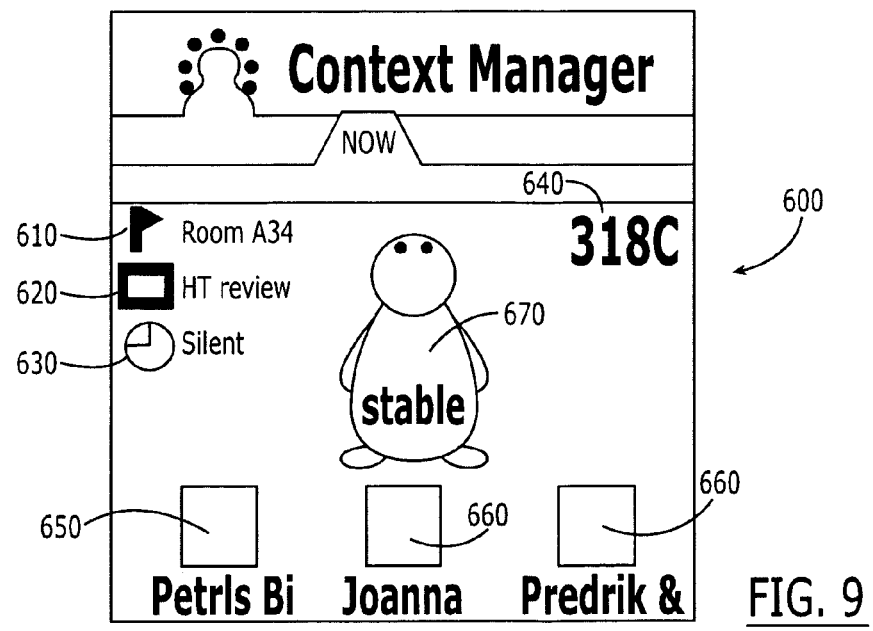

FIG. 9 is an idle screen mode view of a diary application that provides a presentation of current context information, in accordance with an embodiment of the present invention.

Figure 10:
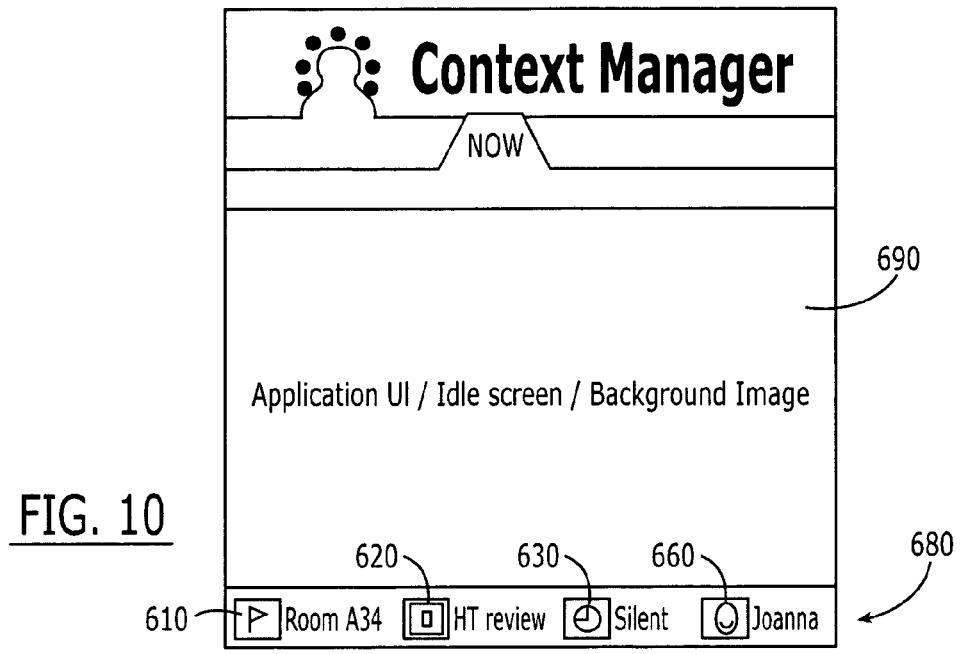

FIG. 10 is a rolling ticker bar window view of a diary application that provides a presentation of current context information, in accordance with an embodiment of the present invention.

FIGS. 11A-11G provide various views encountered by a device user in creating a multimedia presentation within the diary application, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods, computer program products and devices for providing the user of digital device a context information management application, such as, a diary of context information. The diary provides context information, such as device location, device movement, device environment and the like in relation to a period of time. In this regard, the diary utilizes a time-line based user-interface to display captured context information. It should be noted that for the purposes of the invention the term "a period of time" includes a moment in time, an event in time and any other time entity. As such, the diary provides a device user efficient access to contextual information that is captured and stored by the digital device. In addition the diary provides the user graphical presentations that allow for the user to navigate between a general overview of contextual information to more detailed views of selected context data.

The context diary of the present invention may be provided for in a separate stand-alone application or the context diary may be incorporated in existing calendar-type applications that display a timeline representation of future events. Typically, calendar-type applications are implemented on digital devices 10, in FIG. 1, such as mobile telephones, personal digital assistants (PDAs), mobile communication devices, personal computers, laptop computers and the like to provide the user a planning mechanism for future events. In embodiments of the invention in which the context diary is incorporated in a calendar-type application the captured context information history will be displayed in relation to a historical time line. In another embodiment, the context diary may incorporate a media diary or media management application/calendar application or vice versa.

FIG. 1 provides a general overview of a system for capturing context information, in accordance with an embodiment of the present invention. The digital device 10, typically a mobile digital communication device will typically include a central processing unit 12, user interfaces 14, such as a keypad, display and the like, wireless communication interfaces 16, such as transceivers and the like, and memory elements 18 that store various device related applications 20, including the context diary application of the present invention alone or incorporated with applications or features of the media diary and/or the calendar application.

The digital device 10 will either rely on personal sources, such as personal 1 sensors and personal applications for context and/or content information and/or the device may rely on external sources that communicate with the device via a network. Personal sensors are typically internal to the digital device that is operating the context diary. However, in certain embodiments of the invention, the personal sensors may be separate from the digital device and in communication with the digital device through an acceptable communication interface. If the device relies on personal sources for contextual information, these sources may include, but are not limited to, personal sensors 30, personal applications 32, personal databases 34 and the like. The sensors 30 may take the form of Global Positioning Sensors (GPS), temperature sensors, altitude sensors, barometric pressure sensors, motion sensors, acceleration sensors, electronic compass, medical sensors, such as blood pressure sensors, blood sugar sensors, heart beat sensors and the like. One or more of the personal sensors 30 may be incorporated in a personal wrist watch or in a personal health or medical monitoring device. The personal applications 32 may include a calendar application, a media diary application or the like and the personal databases 34 may include a media storage application, an event log, a file manager or the like.

If the device relies on external sources for contextual information the device will typically monitor the devices environment for any context and or content information from external sources. Monitoring the environment may involve one or several wired or wireless communication means, including, but not limited to, Bluetooth® (communication in the about 2.45 GHz frequency range), Ultra WideBand (UWB) communication, Wireless Local-Area Network (WLAN), Radio frequency Identification (RFID), wireless telecommunication, Internet, Digital Video Broadcast (DVB), Digital Multimedia Broadcast (DMB), Amplitude Modulation (AM), Radio Data System (RDS), IrDa, Digital Audio Broadcasting (DAB) and the like. The context and/or content information may be registered or updated within the context diary and/or the content diary when detected or received or it may be registered or updated based on predefined time intervals, such as every second, minute or hour.

The external sources include any external electronic devices that have the appropriate communication interface to communicate with the digital device. The external sources may include, but are not limited to, devices 40, sensors 42, Internet resources 44, digital broadcast information 46 and the like. The devices 40 may include printers, display devices, access points, network nodes, industrial control devices, domestic appliances, consumer electronic devices, computers, mobile communication devices, wrist watches, etc. The devices 40 may include one or more sensors and/or applications. The sensors 42 may include Global Positioning Sensors (GPS), temperature sensors, altitude sensors, barometric pressure sensors, motion sensors, acceleration sensors and the like. The Internet resources 44 may be any content available through the Internet and the digital broadcast information 46 may be any information transmitted via a wireless or wireline broadcast network. For example, the digital broadcast information may include an electronic program guide (EPG), an electronic service guide (ESG) or the like. In addition to the external sources shown in FIG. 1, the sources may be any received content, such as television or radio broadcast, video or audio files, games, content delivery via the Internet, wireless telecommunication network content and the like.

Context data received from external sources may also include access information, user interface information and/or settings information. For example, a printer device may provide its access information, a room temperature control unit may provide its setting information and instructions on changing the settings. The digital device may store this data and the diary application will access this information when the device comes in contact with external source. Thus, a user may be provided access and settings to the external source through the context diary.

In addition to the digital device and the external sources, the system may additionally include storage means in the form of external mass storage units that store either a portion of or the entirety of the digital device's context information, content information and/or calendar information. Examples of such storage units include, but are not limited to, network servers 50, a personal computer (PC) 52 or laptop computer or a portable and/or wireless personal server device 54, such as a portable music/video/multimedia player that are accessible via a wireless or wireline communication network. In addition to storing context information, the storage means may also store and run the context diary application of the present invention and communicate the user interface aspects of the application to the digital device. Storage and execution of the context diary application at the storage means is typically implemented in instances in which the digital device has limited memory capacity or processing capabilities.

Reference is now made to FIG. 2, which illustrates one type of digital device 10, a mobile terminal that would benefit from embodiments of the present invention. It should be understood, however, that the mobile terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers, mobile telephones, mobile communication devices, wrist watches, digital cameras, digital camcorders, digital audio devices, digital video devices, wireless personal server devices and other types of devices or any combination of the mentioned electronic systems or devices, can readily employ the present invention.

As shown, in addition to an antenna 60, the mobile terminal includes a transmitter 62, a receiver 64, a controller 66, and a processor 68 that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. In some embodiments of the mobile terminal of the present invention, the processor 68 includes the controller 66.

It is understood that the controller 66 includes the circuitry required for implementing the audio and logic functions of the mobile terminal. For example, the controller may be comprised of a digital signal processor device, a microprocessor device, and various analog-to-digital converters, digital-to-analog converters, and other support circuits. The control and signal processing functions of the mobile terminal are allocated between these devices according to their respective capabilities. The controller can additionally include an internal voice coder (VC) 70, and may include an internal data modem (DM) 72. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises a user interface including a conventional earphone or speaker 74, a ringer 76, a microphone 78, a display 80, and a user input interface, all of which are coupled to the controller 66. The user input interface, which allows the mobile terminal to receive data, can comprise any of a number of devices allowing the mobile terminal to receive data, such as a keypad 82, a touch display (not shown) or other input device. In embodiments including a keypad, the keypad includes the conventional numeric (0-9) and related keys (#, *), and other keys used for operating the mobile terminal.

As shown in FIG. 2, the mobile terminal can include a radio frequency (RF) transceiver 84 (which includes a RFID reader) so that data can be shared with and/or obtained from electronic devices including other radio frequency transceivers or transponder tags. In some embodiments of the mobile terminal of the present invention, the RFID reader also includes the processor 68 and/or the controller 66. The mobile terminal can additionally, or alternatively, include other short-range communication transceivers, such as, for example, an infrared (IR) transceiver 86, and/or a Bluetooth® (BT) transceiver 88 (operating in the 2.45 GHz frequency band) operating using Bluetooth brand wireless technology developed by the Bluetooth Special Interest Group. The RF transceiver 84 and/or other transceivers may be associated with the mobile terminal in any manner known to those skilled in the art. For example, in some embodiments, the RF transceiver 84 and/or other transceivers may be integrated in the mobile terminal or may be separate from, but in communication with, the mobile terminal, such as via any type of wireline and/or wireless techniques. The mobile terminal can therefore additionally or alternatively be capable of transmitting data to and/or receiving data from electronic devices and/or tags. Although not shown, the mobile terminal may additionally or alternatively be capable of transmitting and/or receiving data from electronic devices and/or tags according to a number of different wireless networking techniques, including, but not limited to, for example, WLAN techniques such as IEEE 802.11 techniques, wireless telecommunication techniques such as GSM, UTMS or 3G or the like.

The mobile terminal also includes a battery 90, such as a vibrating battery pack, for powering the various circuits that are required to operate the mobile terminal, as well as optionally providing mechanical vibration as a detectable output. For example, the battery 90 may provide at least a portion of the power required to operate the RFID reader.

The mobile terminal can further include memory, such as a subscriber identity module (SIM) 92, a removable user identity module (R-UIM) or the like, which typically stores information elements related to a mobile subscriber. In addition to the SIM, the mobile terminal can include other removable and/or fixed memory. In this regard, the mobile terminal can include volatile memory 94, such as volatile Random Access Memory (RAM) including a cache area for the temporary storage of data. The mobile terminal can also include other non-volatile memory 96, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. The memories can also store one or more applications capable of operating on the mobile terminal.

As a means of capturing context information, the mobile terminal may include a positioning sensor, such as a global positioning system (GPS) sensor 98. In this regard, the GPS sensor is capable of determining a location of the mobile terminal, such as longitudinal and latitudinal directions of the mobile terminal. The mobile terminal may also include one or more additional sensors 100 for sensing the ambient conditions of the mobile user and, more particularly, the mobile terminal operated by, or otherwise under the control of, the mobile user. In this regard, the mobile terminal may include sensors such as, for example, a positioning sensor, a touch sensor, an audio sensor, a compass sensor, an ambient light sensor, an ambient temperature sensor, an ambient pressure sensor, a proximity sensor, and/or an acceleration sensor.

The audio sensor can include the microphone 78, for example, which can detect speech or environmental sounds. The positioning sensor can include, for example, the GPS sensor 98. Additionally, or alternatively, the positioning sensor can include, for example, a radio beacon triangulation sensor that determines the location of the mobile terminal by means of a network of radio beacons, base stations, or access points, as is described for example, in Nokia European patent EP 0 767 594 A3, entitled "Mobile Station Positioning System" published on May 12, 1999, the contents of which are hereby incorporated by reference in its entirety. As will be appreciated, the sensors can also be located in accessory-like mobile terminal covers and/or in a wireless accessory such as a Bluetooth®-enabled device. The sensors may further be located in the environment such as in the user's rooms or vehicles. Also, information capable of being measured by the mobile terminal, such as the time duration of use of the mobile terminal, can be received as sensor data by the mobile terminal. For more information on such sensors, see U.S. patent application Ser. No. 09/854,628, entitled "Context Sensitive Web Services" filed May 15, 2001 and published Nov. 21, 2002 as U.S. Patent Application Publication No. 2002/0173295, the contents of which are hereby incorporated by reference in its entirety.

The measured and/or sensed data may then be utilized, such as by the processor 66, to determine a context and/or change in context of the mobile terminal. Although the context and/or a change in context may be determined in various manners, the measured and/or sensed data may be transmitted according to one exemplary embodiment to a central blackboard that delegates the determined changes in the context to different destinations, such as the RFID transceiver 84, which includes a RFID reader, utilizing a context exchange architecture.

FIG. 3 illustrates a context exchange architecture of a mobile terminal 10 to determine a context and/or change in context of the mobile terminal in accordance with one embodiment of the present invention. As shown in FIG. 3, the context exchange architecture of the mobile terminal 10 according to one embodiment of the present invention includes one or more sensors 100 that are capable of providing measured and/or sensed data, as described above. The sensors are further capable of preprocessing the measured and/or sensed data into "context atoms," such as by a sensor application program interface (API), and thereafter stored. As used herein, a "context atom" generally refers to a specific piece of context-related information. A context atom can comprise an entity that typically has an associated name, value, source (i.e., originator), date and/or any of a number of other attributes. More particularly, the context atom can include other attributes including metadata information, such as the reliability of the context-related information, as well as its accuracy, source, time of creation, etc. For example, a temperature sensor can measure the ambient temperature of the environment around the mobile terminal 10, and thereafter process the temperature into a context atom. Also, for example, the mobile terminal may store a directory that can measure, or record, the last call made or received in the mobile terminal. The last call data can then be processed into a context atom. Further, the terminal may store metadata information on actions and manipulations, such as editing, sending, renaming displaying, etc., performed on a data file. This information can then be processed into a context atom. Further, for example, a three-axis acceleration sensor can measure movement of the mobile terminal. Thereafter, the movement data can be processed into a context atom that may include the current absolute value of acceleration, the value integrated over several seconds, and/or a rough estimate whether the mobile terminal, or more particularly the mobile terminal user, is walking, running, standing still or perhaps sitting in a car.

The context exchange architecture of the mobile terminal 10 also includes a context engine 102, which is capable of receiving, and thereafter storing, the context atoms, as well as providing access to the context atoms in accordance with embodiments of the present invention. The context engine includes a context silo 104 and a context API 106. The context silo can, in turn, include a blackboard 108 and a subscription manager 110. The blackboard is a storage unit for context-related information and, as such, typically stores the context atoms received from the sensors or other context sources (such as other electronic devices, applications, applications residing behind a network, other user terminals, etc.). Additionally, the blackboard can provide an API to query and set context atoms. The subscription manager, in turn, can provide subscriptions to various of the context atoms and/or notifications when such context atoms change. The subscription manager can therefore periodically poll the context atoms based upon such subscriptions and notifications. To provide access to the context silo, the context engine further includes the context API. In this regard, the context API allows one or more user applications 112 and/or one or more timers 114 to access the context data from the blackboard, in accordance with embodiments of the present invention. The timer 114 generally tracks the time between determinations of a change in context of the mobile terminal 10. In other embodiments of the mobile terminal 10, the timer 114 may be included in the user application(s) 112 and/or the context engine 102.

The blackboard 108 is capable of storing context atoms for an indefinite period of time, unless otherwise instructed. For example, one or more context atoms can include an expiration time such that after the respective context atoms expire, such context atoms can be deleted from the blackboard, with a notification transmitted to devices subscribing (described below) to the respective context atom, if so desired. As will be appreciated, however, each time a context atom is updated with different information (e.g., different values), the expiration time can be reset. Also, in such instances as when a new context atom is stored in the blackboard that has the same name and context source (indicating that it appeared from the same source) as a previous context atom already in the blackboard, the new context atom can replace the previous context atom, which can then be either discarded or moved to a history buffer, for example.

The context exchange architecture further includes a data store 116 coupled to the context engine 102. The data store is capable of storing information such as, for example, user preferences, profile information, as well as permissions for a privacy engine 118, also included within the architecture. The privacy engine is capable of providing security and privacy. More particularly, the privacy engine is capable of functioning on any of a number of different levels of security and privacy, from the lowest point of communication (e.g., a firewall) to the highest level (e.g., "who is my friend and who is not"). The user preferences and profiles in the data store, then, can control operation of the privacy engine. For example, the privacy engine can retrieve, from the data store, a list of known friends such that, when the mobile terminal 10 is queried for an action to be performed in accordance with embodiments of the present invention, the privacy engine can indicate whether the action is allowed by comparing the querying entity to the list of friends. In one advantageous embodiment, the privacy engine functions based on devices and/or user applications operating on context atoms in accordance with embodiments of the present invention, as well as a type of action, e.g., put, get, subscribe, notify, etc., as described below. It should be understood, however, that the privacy engine can also utilize other information, including other context atoms and data in the data store to make decisions as to permissions.

In addition to the sources of context-related information within the mobile terminal 10 (e.g., sensors 100 and other data measuring elements), the context exchange architecture can provide for receiving context-related information from sources outside the mobile terminal. In this regard, the context exchange architecture includes a communications manager 120, which can identify other context sources located within a communication distance from the mobile terminal. In addition to identifying the other context sources, the communications manager can initiate contact with such context sources and, in general, provide housekeeping for communications with such context sources. The communications manager can also function as a firewall (along with the privacy engine 118). Advantageously, the communications manager can abstract different connection types to the context engine 102 such that context atoms within the context engine can be stored and/or retrieved regardless of whether the communications manager communicates with other context sources via Bluetooth, GPRS, RFID, USB, or some other link type.

To facilitate the mobile terminal 10 communicating with the cellular network, data network and/or other electronic devices, the context exchange architecture also includes a service interface 122. The service interface operates in much the same manner as the context API 106 in the context engine 102. In this regard, the service interface can comprise, for example, an over-the-air interface, as well as the underlying transport protocols (e.g., Ethernet, GPRS, TCP/IP). In accordance with various embodiments of the present invention, the context exchange architecture also provides a context exchange protocol. Generally, the context exchange protocol comprises a standardized protocol that allows different entities to exchange context atoms in a secure and reliable fashion, regardless of underlying architecture or transmission channel. In this manner, for example, at least a portion of the context atoms stored in the blackboard 108 can be stored in a separate memory device, such as a memory device coupled to an origin server.

The context exchange architecture can additionally provide for creating new context atoms, as well as deleting and/or modifying existing context atoms. In this regard, the context exchange architecture can include a script engine 124, which can store rules and conditions. In one advantageous embodiment, the script engine is capable of receiving external rules according to the context exchange protocol, and thereafter storing the rules. The script engine can then examine the rules, subscribe to the relevant context atoms (described below), and then execute the rules according to conditions defined in the rules. The script engine allows complex rules to be executed for different events. As such, the script engine can reduce the need for application code, as well as reduce bandwidth requirements. Further, whereas the subscription manager typically only transmits notifications when a context atom changes, the script engine can further specify requirements of the conditions to transmit a notification. For example, the script engine can specify conditions such as "transmit a notification only when the value changes by more than 20%." In one embodiment, for example, the rules can comprise one or more Java classes that include executable code defining the conditions of the rules, and/or extensible markup language (XML) scripts that include Boolean logic defining the conditions of the rules.

Each context rule typically includes one or more conditions and one or more actions to be performed when the conditions are satisfied. In this regard, the conditions of the context rules are typically related to the context atoms, or more particularly, the values in the context atoms. The script engine 124 can execute any of a number of different context rules that include any of a number of different actions. For example, the context rules can specify the setting of a value of a context atom, the transmission of a notification, and/or the transmission of a context atom to another device and/or application. Context rules can be exchanged between the mobile terminal 10 and other devices, such as electronic devices, in a number of different manners. In one embodiment, for example, context rules can be exchanged in accordance with the context exchange protocol, such as to add a new context rule, remove a context rule and/or notify a device of an expired or otherwise disabled context rule. Alternatively, context rules can be created internally within the mobile terminal.

The elements of the architecture have been described independent of the mobile terminal cell diagram of FIG. 2. It should be understood, however, that the architecture of embodiments of the present invention, such as are illustrated in FIG. 3, are capable of being performed by a mobile terminal that includes the elements illustrated in FIG. 2. In this regard, at least a portion of the elements of the architecture are capable of being embodied in corresponding elements illustrated in FIG. 2. For example, the blackboard 108 and/or data store 116 are capable of being embodied in memory such as SIM 96, volatile memory 98 and/or non-volatile memory 100. Also, the functions of the context engine 102, script engine 124, privacy engine 118 and/or communications manager 120 are capable of being performed by controller 64 and/or processor 66. Additionally, or alternatively, one or more of the elements of the architecture of embodiments of the present invention can be performed by, and/or mirrored by, other elements of the cellular network and/or the data network of FIG. 1. For example, a copy of the contents of the blackboard in the mobile terminal can be maintained in an operator's server (e.g., origin server).

As indicated above, context atoms typically include at least a name and a value, and may also include metadata information such as, for example, its reliability, accuracy, source, time of creation, etc. In operation, the context atoms are typically created by entities called "context producers." A context producer can comprise any of a number of different internal or external systems, devices and/or elements capable of creating a context atom, but in one typical embodiment, a context producer can comprise an internal sensor 94 and/or user application 112, and/or an external system, device and/or element (e.g., sensor or user application) capable of pushing a context atom to the mobile terminal, such as in accordance with the context exchange protocol. Upon creation and/or receipt by the mobile terminal, the context atoms can be stored in the blackboard 108. For example, a thermometer can measure the ambient temperature of the environment and process the temperature measurement into the context atom "environment.temperature=95° C.," which can then be stored by the blackboard 108. Additionally, or alternatively, a temperature change over a period of time can be determined, such as by a user application 112, and stored by the blackboard. As another example, a sensor (input device) can retrieve a signal from local beacons that identify the location of the mobile terminal and process the signal into the context atom "location.logical=sauna," which can thereafter be stored by the blackboard.

The mobile terminal 10 can receive measurements from any of a number of different types of local beacons capable of transmitting information such as, for example, a Bluetooth device and/or a RFID tag. In this regard, when the local beacon comprises a RFID tag, a RFID transceiver 82 within the mobile terminal can receive the signal from the beacon by performing a service discovery to determine the RFID tag identifiers in the vicinity of the mobile terminal. The identifiers can then be stored by the blackboard as the context atoms "local RFID tag environment." Another application, referred to as a context consumer and described below, can then subscribe to the "local RFID tag environment," to thereby receive periodic updates of the measurements received by the RFID transceiver 82. In this regard, the mobile terminal can monitor the area proximate the mobile terminal for electronic devices, and request location information from them, if available. The mobile terminal can then store any available location information back on the blackboard 108, where other applications (context consumers) can get the information. In the example given above, a RFID beacon can announce its location to be a sauna, so that mobile terminal stores the context atom "location.logical=sauna" in the blackboard.

The preceding example illustrated the mobile terminal 10 storing a context atom identifying a logical location (i.e., sauna). It should be understood, however, context atoms can be created to identify any of a number of other types of locations, such as an exact location (e.g., GPS coordinates and/or addresses) and/or a relative location (e.g., "next to K-Mart"). The use of the GPS sensor 92 can be advantageous for providing location information, particularly when the mobile terminal is located outdoors. Even the absence of GPS location information can be useful, however, such as indicating a probability that the mobile terminal is located indoors, where the GPS sensor may not be able to detect location information.

Once stored within the blackboard 108, context atoms are typically retrieved by entities referred to as "context consumers." Like the context producer, a context consumer can comprise any of a number of different internal or external systems, devices and/or elements capable of retrieving a context atom. In this regard, when a context consumer desires to retrieve a context atom, the context consumer connects to the mobile terminal 10, such as according to the context exchange protocol when the context consumer is external to the mobile terminal or according to the context API 106 when the context consumer is internal to the mobile terminal. The context consumer can thereafter transmit a request to the context engine 102 identifying the context atom by name. For example, a request may read "Please give me a context atom called "environment.temperature," where the phrase "environment.temperature" represents the ambient temperature of the environment around the mobile terminal. Additionally, or alternatively, a context consumer can transmit a request identifying a context atom by the source of the respective context-related information, and/or a combination of the source and the context atom name, thereby permitting a context consumer to limit its queries to a specific context source. For example, a context consumer can transmit the request "Please give me all the context atoms provided by the temperature sensor in the mobile terminal." In one typical instance, an application may desire to act as a preprocessor to a singular sensor such that the application does not want to receive context atoms associated with other sensors providing the same context-related information. This, of course, means that the name of a context atom may not be unique, but that a context atom may be characterized by one or more other attributes, including the source of a context atom.

In response to the request, the context engine 102 can then query the privacy engine 118 as to whether the context consumer is allowed to retrieve the requested information. If the context consumer has permission to retrieve the requested context atom, the context atom is transmitted to the context consumer. In this regard, if the context atom is requested by an application internal to the mobile terminal, such as, for example, user application 112 or any other application associated with processor 66, the context atom is typically transmitted by the context engine through the context API 106. If the context atom is requested by an external application, however, the context atom is typically transmitted by the context API 106 to the communications manager 120, which will then transmit the context atom over a communications link in accordance with the context exchange protocol.

If the context consumer does not have permission to retrieve the requested context atom, however, the context atom is not transmitted to the context consumer. In such instances, the context engine 102 can transmit a message to the context consumer indicating that permission to retrieve the context atom was denied, if so desired. In case of a request received from an external application or device in accordance with the context exchange protocol, the request may be dropped silently, such as in the case of an error or a resend request. In other terms, the context engine can merely ignore the request, and therefore not transmit a response to the context consumer.

In addition to retrieving context atoms, context consumers may also be notified when particular context atoms change, such as when particular context atoms are added to the blackboard 108, removed from the blackboard, and/or otherwise modified. In addition, the context consumers can also specify the extent of a change required before the respective context consumer is notified of the respective change. To receive notifications of changes to particular context atoms, context consumers may subscribe to particular context atoms by requesting to be placed on a notification list for one or more context atoms. As such, when the content of the respective context atom(s) contents change or expire, the context engine 102 can issue a notification to the context consumer. As will be appreciated, however, the context engine will typically check with the privacy engine 118 to determine if the consumer is allowed to receive such notifications. Thereafter, the context engine can keep the context consumer notified of any changes by transmitting a notification to the context consumer following each such change or expiration of the respective context atoms. Whereas any of a number of changes can require notification, the context engine typically transmits a notification in the event of the appearance and disappearance of an atom, change of an atom contents, and/or termination of the subscription.

Once a context consumer retrieves one or more context atoms, the context consumer can utilize the context atoms to determine a context of the mobile terminal 10 (or the user of the mobile terminal), such that the mobile terminal, for example, can be operated based upon the determined context. In this regard, the context consumer can determine a context of the mobile terminal, or more particularly the user of the mobile terminal, based upon requested context atoms, and thereafter transmit the context back to the mobile terminal such that the mobile terminal can perform one or more actions based upon the context. For example, the context information can be utilized to configure the mobile terminal based upon the determined context, such as by changing the volume of the mobile terminal according to ambient noise (physical context), changing menus displayed by the mobile terminal according to whether a user is with a digital tribe associated with the user (social context), and/or highlighting email messages that have the same context as an email displayed by the mobile terminal (subject context). For more information on the context exchange architecture, see U.S. Provisional Patent Application No. 60/460,316, entitled "System, Mobile Station and Method for Managing Context-Related Information" filed on Apr. 3, 2003, the contents of which are hereby incorporated by reference in its entirety.

In accordance with an embodiment of the present invention FIGS. 4-6 provide a screenshot, otherwise referred to as a view, that is generated by a computer program product, otherwise referred to as an application. FIG. 4 provides an example of an overview context view 200 in combination with a timeline view 300. In the context view historical context information is presented in a matrix having fixed width time period columns 210. The time span of the matrix, i.e., the width of the time period column, may be configured by the user. Alternatively, the width of the time period column may vary according to the amount of context data. Each row 220 within the matrix of the context view represents a specific context category. In FIG. 4, five rows in the leftmost column are evident signifying five context categories (Context 1-Context 5). Vertical scrolling of the view may provide for additional context items to be displayed within the view.

The context view can be customized for the display of multiple context categories, i.e., context parameters. The context parameters may include, but are not limited to, terminal movement, terminal location, detected devices in the proximate area of the terminal, detected persons in the proximate area of the terminal, files created by the terminal, files received by the terminal, calendar entries, temperature and/or other environment related parameters (e.g. barometric pressure, altitude, etc), health related parameters (e.g. blood pressure, blood sugar, heart beat, etc) and the like. It should be noted that in certain instances detected devices, persons, locations, etc, will not have or offer exact identification information. In these instances, in order for the context diary to provide specific context information related to the device, person, location etc., the user may be provided the option of manually editing or adding to the context information. However, in most instances, precise identification of the device, person, location etc. is provided by the context source and, as such, manual functions implemented by the user are limited.

Depending on the characteristic of the parameter, the visual attribute that appears within a cell of the matrix will vary and can be adjusted by the application user so that it is easier for the device user to discern important aspects of the context view and patterns within a timeframe. It is noted that the FIG. 4 embodiment shows no visible attributes within the cells of the matrix. The visual attribute may include but is not limited to icons, such as flags, color-coding of the cell or the icons within the cell, varying the size of the icons within a column to signify a range or quantity and the like. Additionally, the visual attribute may include number and/or text strings, lines, curves, bars, spots, topographic presentation or any combination of the above mentioned.

The context diary application will readily provide for the sharing of historical context, content and/or setting information with other digital devices/users. In short-range communication environments sharing of the data may occur without the knowledge of the device that is sharing the information. Therefore, the context diary application may provide for the labeling of information as private or public or otherwise prioritizing the data to insure that certain context information is not readily shared with the public.

In the FIG. 4 example each column 210 represents an hour time period between 7:00 and 18:00 within one of three days (Tuesday-Thursday, June 18-20). The hour time period is designated by the corresponding number in the last entry in each column. Alternatively, the time period in the columns 210 may be selected to be any time period, such as second, minute, day, week, month, year, etc. The application may be configured or the user may designate the time periods that are preferred for display within the view. Typically not all hours within a day will be displayed within the view because of display size limitations. In the illustrated embodiment the 7:00-18:00 hour time periods signify the time periods in which the device is mostly likely to encounter or experience a change in context information (i.e., the active hours). In addition, the application may provide for horizontal scrolling of the time periods within a day. In addition, it may be possible for the user of the device to configure the context diary application by providing a name, note bookmark, etc. for a specific period of time. The application will then present the time period identifying name, note, bookmark, etc. in the context view to provide the time period specific meaning and to aid the user in finding the time period within the historical context information database.

The timeline view 300 includes a time bar 310 and a media handle 320. The media handle will be moveable on the display for the purpose of providing viewable access to different time periods within the context diary. The media handle 320 depicted in FIG. 4 is shown in a stationary rest position, preferably in a centerline position. In the centerline position the media handle is associated with an underlying column of the context view and the media handle will display the date associated with the underlying column. Additionally, in the centerline position the media handle will typically be associated with an underlying time unit, such as a day, of the time bar. The media handle will typically display the time unit, such as the date, associated with the underlying time unit in the media handle. For more information related to the media handle, please refer to U.S. patent application Ser. No. 10/738,006, entitled, "Time Handle in a Media Diary Application for Accessing Media Files" filed on 17 Dec. 2003, in the name of inventors Finke-Anlauf et al. and assigned to the same inventive entity as the present invention. That application is herein incorporated by reference as if set forth fully herein.

The time bar may be hierarchal in nature such that it is presented to the user with various levels that allow the user to maneuver through the levels to pinpoint the specific time period associated with the context information of interest. For example the time bar may incorporate levels associated with years, months, weeks, and/or days. The user of this time bar can start at the year level and maneuver through the month and week level to locate the specific date associated with the media file. For more information related to the time bar, please refer to U.S. patent application Ser. No. 10/715,162, entitled, "Time Bar Navigation in a Media Diary Application", filed on 17 Nov. 2003, in the name of inventors Metsätähti et al. and assigned to same inventive entity as the present invention. That application is herein incorporated by reference as if set forth fully herein.

FIG. 5 provides a combined context, media and timeline view, in accordance with an embodiment of the present invention. The timeline view 200 is presented at the top portion of the view, the media view 400 is presented in the middle portion of the view and the context view is presented in the bottom portion of the view.

The media view 400 will typically display icons (not shown in FIG. 5) representing media files, such as text files, i.e., emails, SMS messages or the like, image files, video files and the like. Additionally the icon may be presented with a file identifier in the form of a portion of file related metadata. For a more comprehensive discussion regarding the media view and the related media diary application, see U.S. patent application Ser. No. 10/792,175, entitled, "Media Diary Incorporating Media and Timeline Views", filed on 3 Mar. 2004, in the name of inventors Cartier et al. and assigned to the same inventive entity as the present invention, That application is herein incorporated by reference ass if set forth fully herein.

The media view portion of the diary will typically calendar events and provide metadata for the events that will be used for future reference in the historical data presented in the context view. However, many events occur that are not planned and furthermore, are not provided for as an entry in the calendar/event log or otherwise displayed in the media view. Therefore, the application of the present invention uses context information to automatically interpret a certain time period as a period denoting an "event" and the diary application will create an event entry in the context view of the application. The application will typically provide for the user to personalize the automatically created event entry by adding text notes, title, images or a personalized icon. Once the application has identified a time period as an event period, the event can be utilized to provide display of all the context information related to the event.

In the illustrated example of FIG. 5 the width of the time periods may vary based upon the existence and density of historical context information and/or the existence and density of media files for the particular date. In the illustrated embodiment the width of the date columns 230 vary according to the volume of context or content. For example, the width of the column for Monday 17 June is condensed due to a small quantity of context information and/or media files. The date of Tuesday 18 June is also condensed by wider in column size due to the presence of more context information and/or content information than is present on Monday 17 June. The date of Thursday 20 June provides for the widest width column, a full mode column, corresponding to the presence of the most context information and/or media files.

FIG. 6 provides a combined context, media and timeline view, in accordance with an embodiment of the present invention. In the FIG. 6 embodiment the width of the date columns 230 are fixed and, therefore, unlike the FIG. 5 embodiment, do not vary according to density of context information and/or media files present on a particular date. The width of the columns in the FIG. 6 embodiment, similar to the selection of width in the FIG. 4 embodiment, is based upon a selected or determined time span of the context or media view.

Content presented in the media view, such as media files, SMS or MMS messages, emails or the like may be associated, i.e., related to, context information presented in the context view and vice versa. When a user of the application selects a media item in the media view associated context information may be highlighted or otherwise indicated in the context view. Additionally, associated context information may be presented in an additional window that is opened and placed adjacent to the selected and associated media item. From the alternate perspective, when a user selects one or more context items in the context matrix associated media items in the media view may be highlighted, otherwise indicated, presented, etc. Additionally, associated media item(s) may be presented in an additional window that is opened and placed adjacent to the selected and associated context information. Alternatively, context information associated with one or more media items may be presented as a watermark or bookmark on the presentation of the of the media item.

Additionally, when a media item is received, created or otherwise edited within the media diary portion of the combined application context information related to the moment of receipt, creation, editing, etc, may be added to the media file in the form of metadata. For example, when a multimedia presentation is presented at a meeting, context information related to the meeting (e.g. time of the meeting, devices encountered, environment conditions, persons encountered, etc) is added to the presentation's metadata. Similarly, when the presentation is electronically communicated to meeting participants context information related to the communication is added as metadata to the presentation file. The media file's context information is accessible in the context diary application according to the time period of the presentation or the time period of the electronic communication.

FIG. 7 provides an alternate embodiment of the invention, in which the context view is displayed and the time periods are defined by a user-selected context category. For example in the illustrated embodiment the user has selected device location as the context category of interest. This category is presented in bold faced type along the top row of the presented context categories. The time periods in the timeline view are defined in relation to the user-selected context category, such as movement of the device from location to location. For example, during the first time period from 00:00 to 7:28 the device is located at the user's residence. This time period is indicated in the leftmost column of the presentation. During the second time period, defined from 7:28 to 7:55, the device is located in the user's automobile and during the third time period, defined from 7:55 to 9:30, the device is located at the user's place of employment, in the user's office. The context information for the other categories in the presentation relate to the time periods that are defined by the selected category. For example, during the initial period when the device is located at the user's residence, the movement category indicates that the device is stable, the temperature reflects the average temperature at the residence, the device category indicates that no other short-range wireless devices were encountered, the persons met category indicated no persons were met or available, the user's blood pressure was determined to be normal and no media items, available in the media view, were captured or received during this period. As the device and user move to the car, i.e. the second time period, the movement category indicates device movement, the temperature reflects the average temperature in the automobile, the device category indicates that a Bluetooth® headset and a music player were encountered, the persons met category indicated no persons were met or available, the user's blood pressure was determined to be normal and no media items, available in the media view, were captured or received during this period. Additionally, one of the context categories may describe actions and/or manipulations performed on media files, for example from 7:56-12:08 one cell of the column may describe "7 emails received: 1 SMS received: Presentation for monthly meeting ppt sent to John Doe".

FIG. 8 provides an alternate embodiment of the context view 500 of the context diary application, in accordance with the present invention. In FIG. 8, context information is presented in a day view that is scrollable vertically and horizontally. Selection of the day may be accomplished in a calendar view or by format. Scrolling from day-to-day may also occur by vertical scrolling. In the FIG. 8 embodiment the cells of the matrix include icons that represent context information. The context view can be customized for the display of multiple context items/parameters. Depending on the characteristic of the parameter and the importance to the device user, the visual attribute or icon associated with the parameter can be adjusted so that it is easier for the user to discern. Furthermore the visual attributes or icons can work in unison to support the functionality and readability of the information, aiding the device user in personalizing the context information that is presented.

The left-hand-most column 510 lists the time periods in one hour cells of time. Context items are listed in the event column 512, the location column 514, the Bluetooth® device column 516, the device movement column 518, the temperature column 520 and the content column 522.

The event column 512 displays event icons 524. In the illustrated embodiment the event icon is a meeting icon indicating that the device/use attended a meeting in the 16:00 hour. The straight line icon 526 in the 17:00 hour cell of the event column indicates that the meeting continued through the 17:00 hour.

The location column 514 may display straight line icons 526, zigzag line icons 528, and color-coded flag icons 530. Straight line icons indicate that the device stayed in the same location as the previous hour. Zigzag line icons indicate that the device was located in different locations throughout the time period. A flag icon indicates that the device stayed in the same location for the time period and the color of the flag may indicate whether the location is labeled or unlabeled.

The Bluetooth® device column 516 may display color-coded blob icons 532. The size of the blob indicates a quantity range of Bluetooth® devices encountered during the time period. The movement column 518 may also display color-coded blob icons 532. The size of the blob indicates the amount of movement encountered by the device during the time period. In the above mentioned cases, each color-code or icon type indicates a different type of device or movements indicated. The temperature column 520 may include color-coded highlighting 534. Each color-code indicates a specific temperature range.

The content column 522 may display color-coded blob icons 532, color-coded bar icons 536 or the like. Each color-code or icon type indicated a different type of media file; i.e., image file, video file, email file, SMS file, etc. The size of the icon will typically indicate a range of quantity of files that have been captured, received, presented, created edited, sent etc. during the time period. Additionally, cells in any of the context columns may include one or more color-coded indicators.

The number of context columns presented will typically be limited due to display size. Optionally the context columns may be scrollable to provide for the presentation of additional context categories. The user of the device may configure the context columns so that the most relevant context categories are presented in the view are presented in the initial view, i.e., prior to scrolling.

A device user may select and activate either a row, a column or a cell within the context view matrix to provide more detailed information related to the context category, the time period or the context item for a given time period. The more detailed information will typically be presented in a separate view on the device display on a time-line format with context information, a time-line format with content information or in a content presentation format. Depending on the attributes of the context category, item or period of time, the more detailed information can be designed to allow the user to customize the labels of the recognized content value. Further selection and activation within the more detailed view may be possible to provide the user with even more information related to context category or context item.

In addition to storing historical context data the context diary may provide for presentation of concurrent context information; i.e., information related to the current state of the user/device. In one embodiment of the invention the digital device will monitor the current environment for context information. Monitoring may involve receiving current context information from the device itself; i.e., internal sensors or applications or receiving current context information from external sources via wireless communication. The current context information can be presented within the context view, along with the historical context information or the current context information may be presented in a separate view. For example, the current context information may be presented in an idle screen view (i.e., when the device is idle), a ticker bar view that scrolls continuously the current context information, on a background image (i.e., wallpaper image), on a special application or the like. The current context information will be updated within the view when a change in context occurs. For example, movement of the device to a new location, detection of a new context information source, disappearance of a context information source or when detecting a new value for at least one of the currently identified context items. Additionally, the context diary application may provide for further access to a current context item by selecting a context item through appropriately configured user-interface activation. Further access of the current context item may entail accessing or communicating with the source of the current context item or changing a current setting value of the context item.

FIG. 9 provides an example of an idle mode view 600 that presents the user of the device current context information when the device resides in the idle mode state, in accordance with an embodiment of the present invention. The idle mode view may display selectable icons or other graphical indicators to context items that are specific to the current location or moment in time. For example, a flag icon 610 indicates location information, a folder icon 620 indicates a calendar entry, a key button icon 630 indicates device profile information, a temperature icon 640 indicates current temperature, a device icon 650 indicates devices available in the location, person images 660 indicate individuals available at the current time and location and an avatar 670 indicates the device user and the current condition/movements of the device user. These icons may be selected by the device user to provide further information related to the context and/or access to the context source.

FIG. 10 provides an example of a rolling ticker bar window 680 that presents the user of the device current context information in a condensed format, in accordance with an embodiment of the present invention. The rolling ticker bar window allows current context information to be displayed in condensed form while the remainder of the display screen 690 is free to provide presentation of another application UI, an idle screen, background image or the like. Rolling ticker bar window will display a continuous roll of selectable icons or other graphical indicators related to context items that are specific to the current location or moment in time. As shown, a flag icon 610 indicates location information, a folder icon 620 indicates a calendar entry, a key button icon 630 indicates device profile information, and person images 660 indicate individuals available at the current time and location. Additional icons representing additional context items may be presented as the window scrolls.

Additionally, the context diary application of the present invention is not limited to display of historical or current context information and may, in certain instances, provide for future context information or forecasts of future context information in a future context view. Such future context information may include, but is not limited to, calendar events, weather forecasts, electronic program or service guide (ESG or EPG) information or the like. The future or forecast context information may be presented also in the historical context view as separate categories of future information, forecasted information, realized/actual information and the difference between forecasted and actual information.

In accordance with another embodiment of the present invention, the context diary application may provide for the creation of multimedia files that collect context items and provide a presentation on content and context related to a specific period of time, event, and location. In creating the multimedia presentation the application will rely on files associated with a time period, files associated with a location, avatars selected to represent movement, recognized local devices and the like. The multimedia presentation will typically be created in a format supported by the digital device to provide for local sharing or MMS communication of the presentation.

Figure 11A:
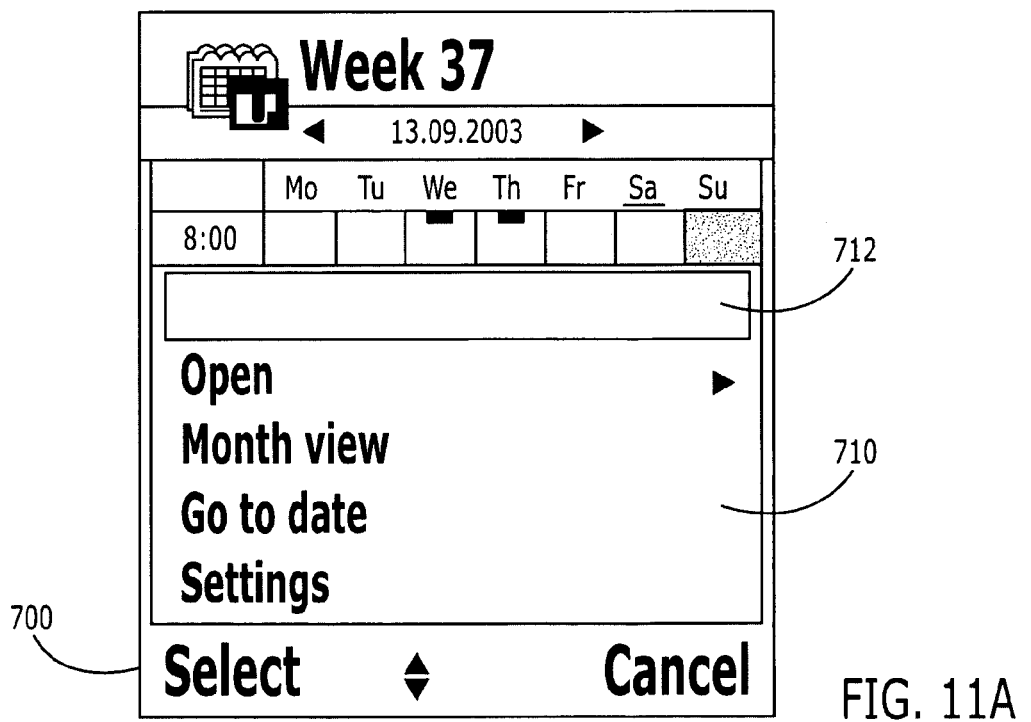
Figure 11C:
Figure 11B:
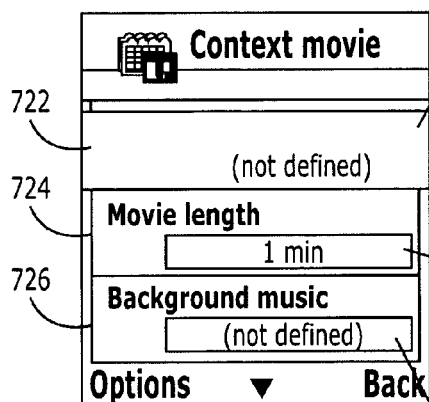
Figure 11D:
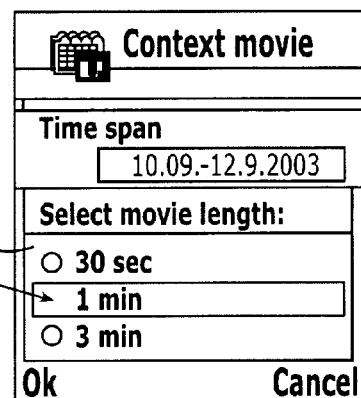
Figure 11E:
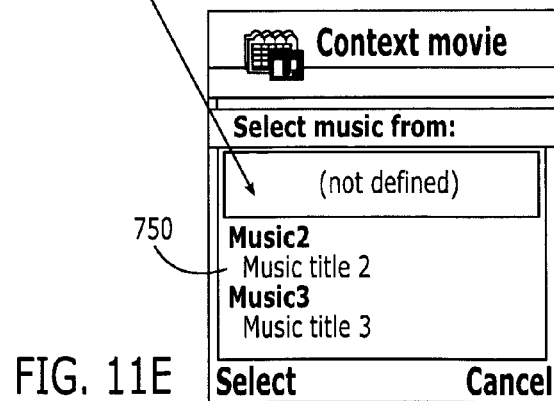

FIGS. 11A-11G provide an example of the creation of a multimedia file; in accordance with an embodiment of the present invention. In FIG. 11A, the user activates the "select" function 700 and is presented drop down window 710. The user then selects the "create context movie" option 712 from the drop down window. FIG. 11B provides a context movie view 720 that is presented upon activation of the "create context movie option 712. The context movie view provides the device user with options for creating the movie including content files and context information on a specific time span. Content files are presented chronologically with context information. For example, time span 722, movie length 724 and background music 726 may be selected by the user of the device. Selection of the time span will activate the calendar view 730, shown in FIG. 11C. The user will then select appropriate dates and or times from the calendar view and the movie/presentation will incorporate all multimedia files related to the chosen dates/times. Selection of the movie length will activate the "select movie length" view 740, shown in FIG. 11D. Selection of a movie length will define the length of the clip that is to be created. Alternatively, the length of the clip may be automatically determined by the amount of context and content information in the selected time span. Selection of the background music will activate the "music selection" view 750, shown in FIG. 11E. Selection of a music clip will result in the music clip being used as background music in the presentation. Alternatively, the music clip or an audio file may be selected according to context information describing a music clip or the audio file that was presented at the specific moment or period of time.

Figure 11F:
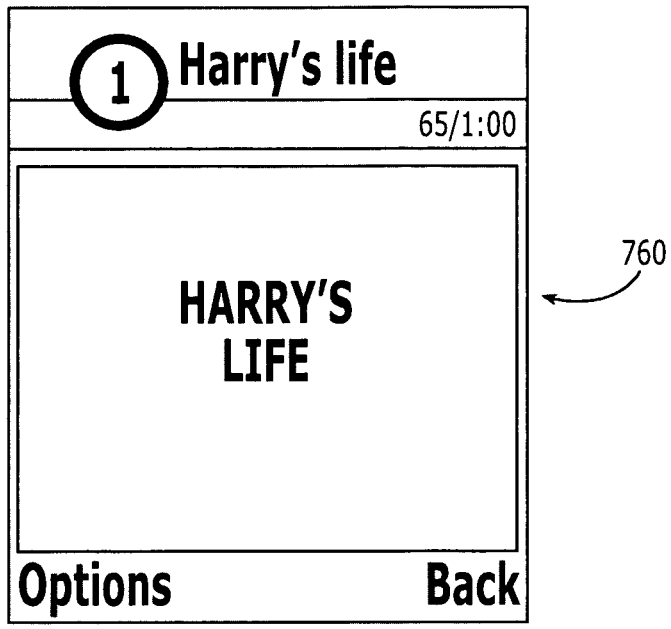
Figure 11G:
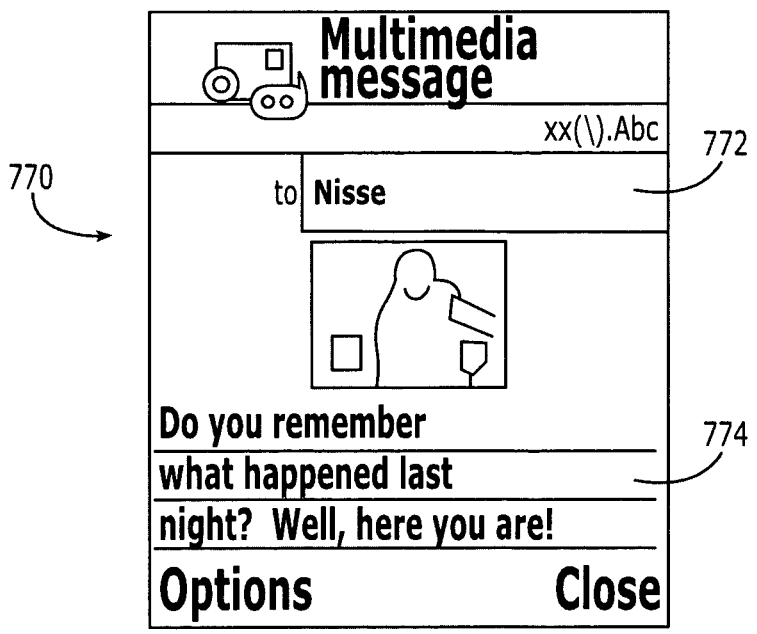

Once all the movie options have been defined the user will be presented with a preview view 760, as shown in FIG. 11F. The preview view allows the user to preview the created video presentation and to subsequently save the video through the options menu, if the user desires to save such. Additionally, the options menu will provide an option for the user to send the file, via Multimedia Message Service (MMS) to one more recipients. FIG. 11G provides an MMS view 770 that attaches the created video file and allows the user to define the recipients 772 and add text to the message 774.

Thus, the present invention provides for applications, devices and methods for providing contextual information to digital device user in a presentation that associates the contextual information with a period of time. As such the present invention provides for efficient user access to historical, as well as, current contextual information. In addition, the present invention provides for current contextual information to be presented in an idle mode view, a scrolling bar mode view or another inconspicuous view. Additionally the present invention provides a novel means of using context information to create multimedia file presentations; image or video file presentations that can be associated with previous periods of time, locations or other context data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile terminal comprising:
   two or more sensors for sensing two or more types of context data;
   a sensor application program interface (API) for processing the sensed data to provide one or more context atoms relating to specific pieces of context-related information, wherein each context atom comprises an entity having an associated name, value, source, and date;
   a context engine for receiving and storing the context atoms, the context engine including a context silo for storing the context atoms and a context API for allowing one or more user applications to access the context data;
   a data store coupled to the context engine for storing information related to a user;
   a privacy engine for providing security;
   a communications manager for identifying context sources external to the mobile terminal and initiating contact with the external context sources; and
   a display for presenting the context-related information and/or information from the external context sources in the manner of a diary,
   wherein the context atoms are stored in a blackboard within the context silo, and the blackboard provides an API for querying and setting the context atoms.

2. The mobile terminal of claim 1, wherein the context silo further comprises a subscription manager for providing subscriptions to one or more of the context atoms and for providing notifications in the event of a change in the context atoms.

3. The mobile terminal of claim 2, wherein the subscription manager periodically polls the context atoms based upon the subscriptions and notifications.

4. The mobile terminal of claim 1, wherein the one or more context atoms further includes attributes including metadata information, the metadata information associated with reliability of the context-related information.

5. The mobile terminal of claim 4, wherein the metadata information further includes information associated with accuracy, source, and time of creation.

6. The mobile terminal of claim 1, wherein operation of the privacy engine is responsive to the information related to the user.

7. The mobile terminal of claim 6, wherein the information related to the user comprises user preferences, profile information, and/or permissions for the privacy engine.

8. The mobile terminal of claim 1, further comprising a time-line based user interface, wherein the time-line based user interface is used to display the context information in relation to a period of time.

9. A method comprising:
   sensing, in a mobile terminal, two or more types of context data;
   processing the sensed data to provide one or more context atoms relating to specific pieces of context-related information, wherein each context atom comprises an entity having an associated name, value, source, and date;
   receiving and storing the context atoms in a blackboard within a context engine, wherein the blackboard provides an application program interface (API) for querying and setting the context atoms;
   storing, in a data store, information related to a user;
   providing different levels of security based on the information related to the user;
   identifying context sources external to the mobile terminal and initiating contact with the external context sources; and
   using the context-related information and external context sources to provide a presentation on the mobile terminal of multimedia files.

10. The method of claim 9, wherein the one or more context atoms further includes attributes including metadata information, the metadata information associated with reliability of the context-related information.

11. The method of claim 10, wherein the metadata information further includes information associated with accuracy, source, and time of creation.

12. The method of claim 9, wherein operation of a privacy engine is responsive to the information related to the user.

13. The method of claim 12, wherein the information related to the user comprises user preferences, profile information, and/or permissions for the privacy engine.

14. The method of claim 9, further comprising:
   providing time-line information; and
   displaying the context information in relation to a period of time.

* * * * *